US007751179B2

(12) United States Patent
Irmer et al.

(10) Patent No.: US 7,751,179 B2
(45) Date of Patent: Jul. 6, 2010

(54) SLIP-OVER DISTRIBUTION CABINET

(75) Inventors: Günter Irmer, Berlin (DE); Helmut Perschon, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/368,859

(22) Filed: Feb. 10, 2009

(65) Prior Publication Data

US 2009/0147483 A1    Jun. 11, 2009

Related U.S. Application Data

(63) Continuation of application No. 10/547,069, filed as application No. PCT/EP2004/001837 on Feb. 24, 2004, now Pat. No. 7,492,575.

(30) Foreign Application Priority Data

Feb. 25, 2003   (DE)   ................................ 103 07 944

(51) Int. Cl.
*G06F 1/16* (2006.01)
(52) U.S. Cl. .................. 361/608; 361/622; 361/641; 361/657; 312/223.2; 312/223.3; 174/35 R; 174/50; 174/52.1
(58) Field of Classification Search .................. 361/600, 361/601, 604, 608, 605, 641, 614, 616, 830, 361/831, 816; 312/223.1, 223.2, 223.3, 236, 312/265.5, 265.6, 100, 111, 108, 257.1; 174/35 R, 174/50, 52.1; 211/26, 181–183, 189, 191; 248/672, 678, 676, 346.01, 346.02, 910
See application file for complete search history.

(56) References Cited

U.S. PATENT DOCUMENTS

| 1,342,269 | A | 6/1920 | Stewart |
| 3,742,119 | A | 6/1973 | Newman |
| 4,644,095 | A | 2/1987 | Bright et al. |
| 4,775,200 | A | 10/1988 | Sheu |
| 4,890,318 | A | 12/1989 | Crane et al. |
| 5,023,397 | A | 6/1991 | Tomes et al. |

(Continued)

FOREIGN PATENT DOCUMENTS

AU   736804   6/1998

(Continued)

OTHER PUBLICATIONS

English translation of Letter of Opposition filed on Oct. 16, 2007 by Deutschen Telekom AG against granted European Patent No. 1597804, which claims priority to the same International application, WO 2004/076278, and German application, DE 1037944, as the pending case (30 pages).

(Continued)

*Primary Examiner*—Michael V Datskovskiy
(74) *Attorney, Agent, or Firm*—Merchant & Gould P.C.

(57) ABSTRACT

Replacing, and in particular extending, the body of an outdoor distributor cabinet includes removing the body of the old distributor cabinet, slipping a new hollow base over the old assembly frame and the old base. A new body, which has at least the same inner capacity as the old body, is placed on top of the old assembly frame, aligned therewith, and secured. Accordingly, the distributor cabinet remains in its original position, whereby no new authorization for installation or building permit is required.

20 Claims, 20 Drawing Sheets

U.S. PATENT DOCUMENTS

| | | | |
|---|---|---|---|
| 5,262,588 | A | 11/1993 | Gallagher |
| 5,459,808 | A | 10/1995 | Keith |
| 5,717,810 | A | 2/1998 | Wheeler |
| 5,734,774 | A | 3/1998 | Morrell |
| 5,737,475 | A | 4/1998 | Regester |
| 5,747,734 | A | 5/1998 | Kozlowski et al. |
| 5,806,948 | A | 9/1998 | Rowan et al. |
| 5,911,117 | A | 6/1999 | Bhame et al. |
| 5,933,563 | A | 8/1999 | Schaffer et al. |
| 6,062,665 | A | 5/2000 | Schneider et al. |
| 6,095,482 | A | 8/2000 | La Grotta et al. |
| 6,127,627 | A | 10/2000 | Daoud |
| 6,160,946 | A | 12/2000 | Thompson et al. |
| 6,238,029 | B1 | 5/2001 | Marzec et al. |
| 6,316,728 | B1 | 11/2001 | Hoover et al. |
| 6,330,152 | B1 | 12/2001 | Vos et al. |
| 6,498,293 | B2 | 12/2002 | Marchand et al. |
| 6,603,660 | B1 | 8/2003 | Ehn et al. |
| 6,606,253 | B2 | 8/2003 | Jackson et al. |
| 6,657,861 | B2 | 12/2003 | Irmer |
| 6,788,535 | B2 | 9/2004 | Dodgen et al. |
| 6,791,027 | B1 | 9/2004 | Nicolai et al. |
| 6,932,443 | B1 | 8/2005 | Kaplan et al. |
| 2002/0140325 | A1 | 10/2002 | Webster et al. |

FOREIGN PATENT DOCUMENTS

| | | |
|---|---|---|
| DE | 73 192 83 | 8/1973 |
| DE | 42 32 787 | 12/1993 |
| DE | 295 19 260 | 12/1995 |
| DE | 269 13 420 | 10/1996 |
| DE | 296 13 420 | 10/1996 |
| DE | 196 54 594 | 7/1998 |
| DE | 199 27 517 | 11/2000 |
| DE | 199 40 166 | 3/2001 |
| DE | 199 41 413 | 3/2001 |
| DE | 101 05 993 | 9/2002 |
| EP | 05 902 86 | 4/1994 |
| EP | 0 849 850 | 6/1998 |
| EP | 1 047 167 | 10/2000 |
| EP | 1 597 804 | 7/2007 |
| FR | 2 752 103 | 2/1998 |
| FR | 2 766 850 | 2/1999 |
| FR | 2 776 850 | 10/1999 |
| SU | 1 320 857 | 12/1982 |

OTHER PUBLICATIONS

English translation of Letter of Opposition filed on Oct. 12, 2007 by Almatec AG against granted European Patent No. 1597804, which claims priority to the same International application, WO 2004/076278, and German application, DE 1037944, as the pending case (20 pages).

English translation of Letter of Opposition filed on Oct. 17, 2007 by Knürr AG against granted European Patent No. 1597804, which claims priority to the same International application, WO 2004/076278, and German application, DE 1037944, as the pending case (11 pages).

English translation of the Response filed by ADC GmbH to the above listed Oppositions to granted European Patent No. 1597804, which claims priority to the same International application, WO 2004/076278, and German application, DE 1037944, as the pending case (14 pages).

Letter of Opposition filed on Oct. 16, 2007 by Deutschen Telekom AG against granted European Patent No. 1597804, which claims priority to the same International application, WO 2004/076278, and German application, DE 1037944, as the pending case (35 pages).

Letter of Opposition filed on Oct. 12, 2007 by Almatec AG against granted European Patent No. 1597804, which claims priority to the same International application, WO 2004/076278, and German application, DE 1037944, as the pending case (23 pages).

Letter of Opposition filed on Oct. 17, 2007 by Knürr AG against granted European Patent No. 1597804, which claims priority to the same International application, WO 2004/076278, and German application, DE 1037944, as the pending case (12 pages).

Response filed by ADC GmbH to three Oppositions to granted European Patent No. 1597804, which claims priority to the same International application, WO 2004/076278, and German application, DE 1037944, as the pending case (14 pages).

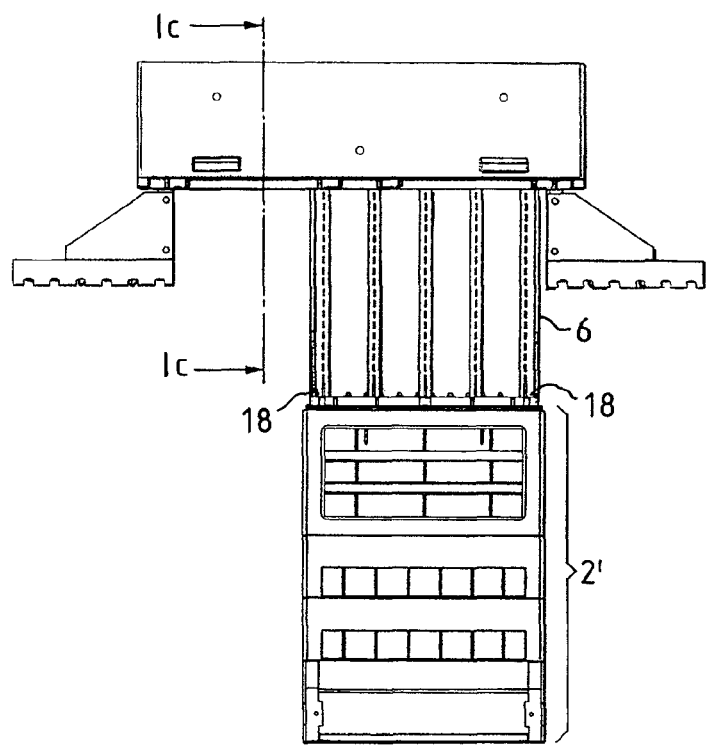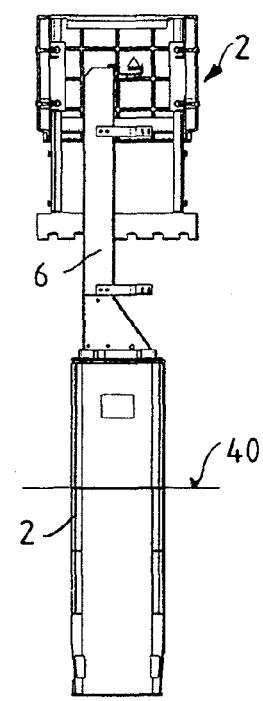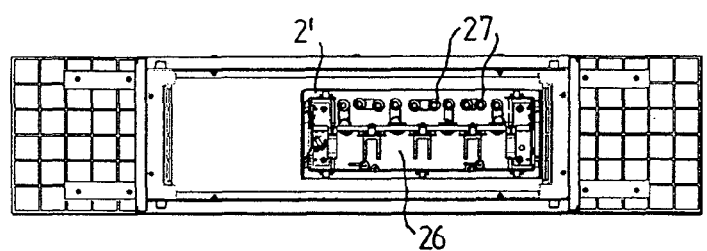

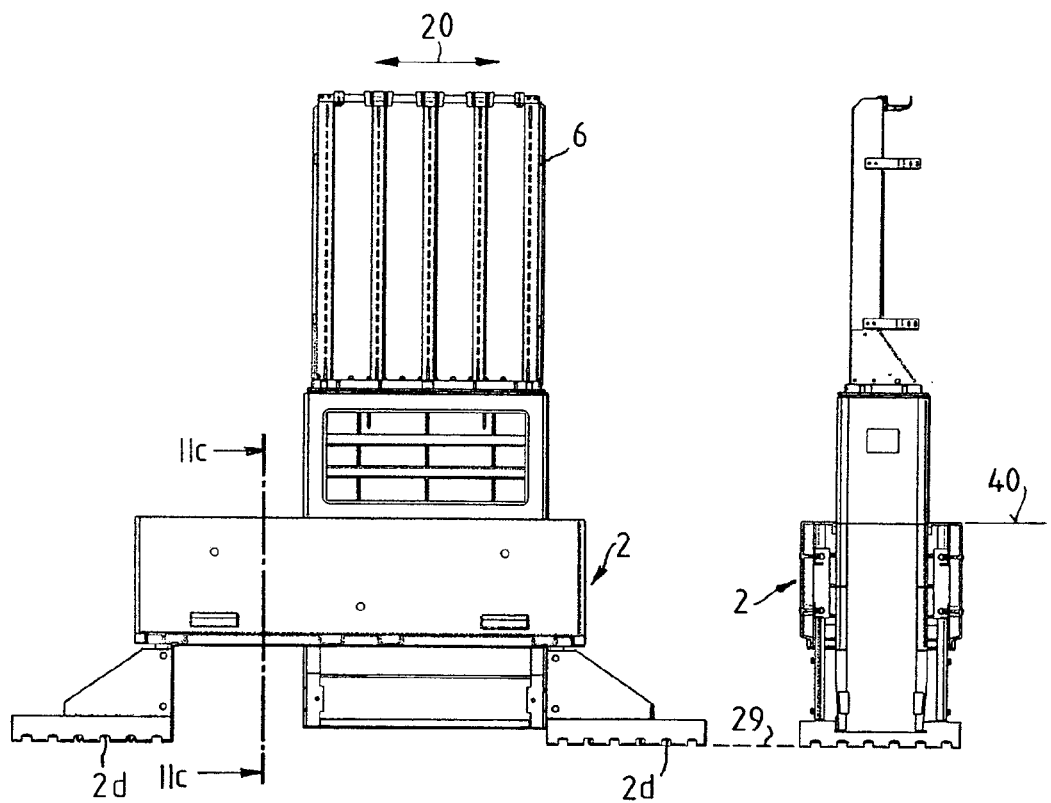
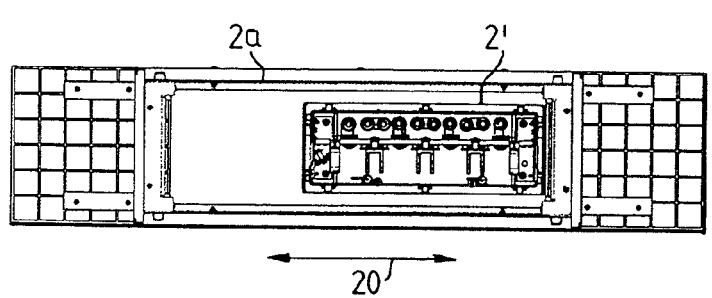

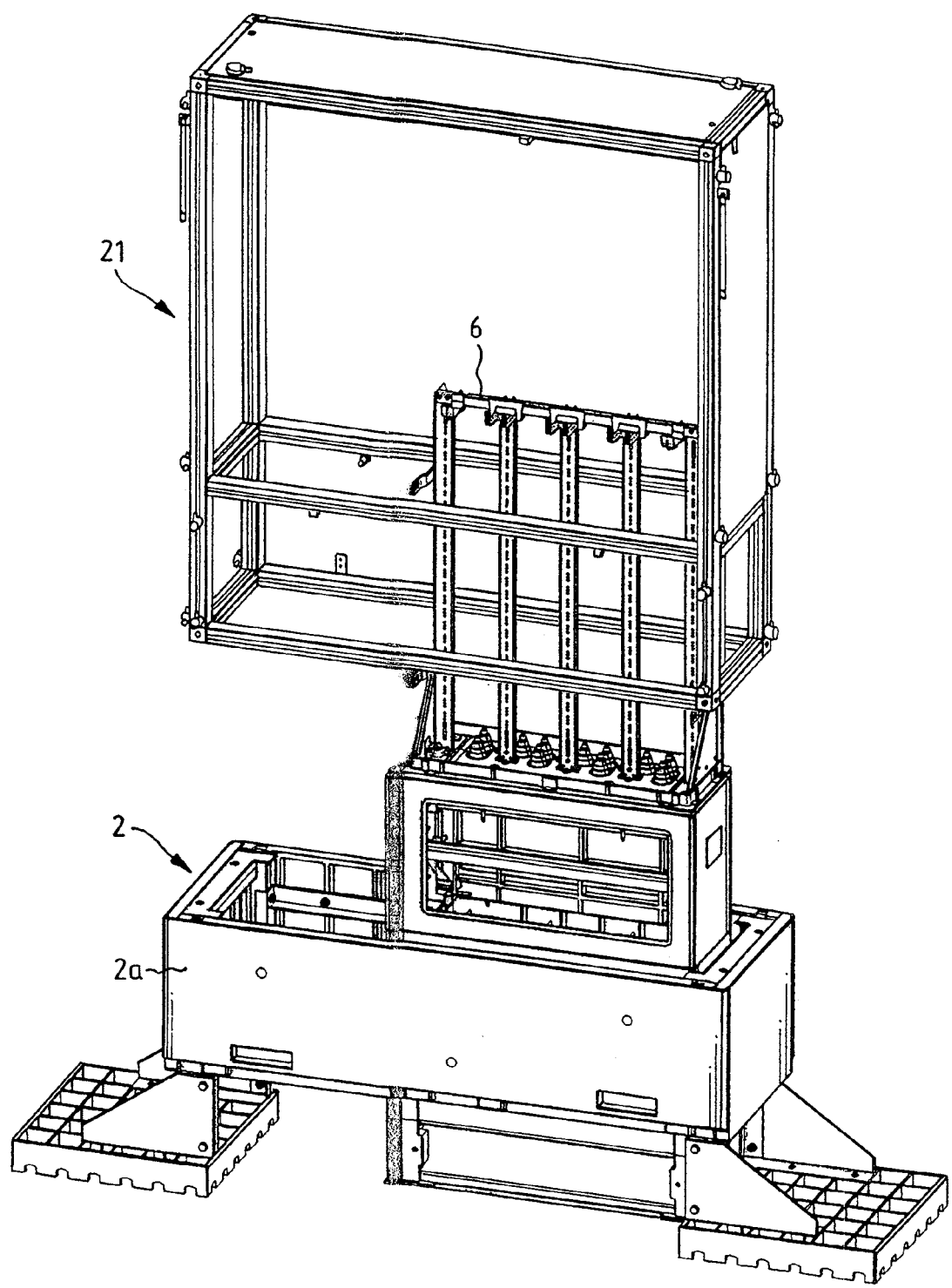

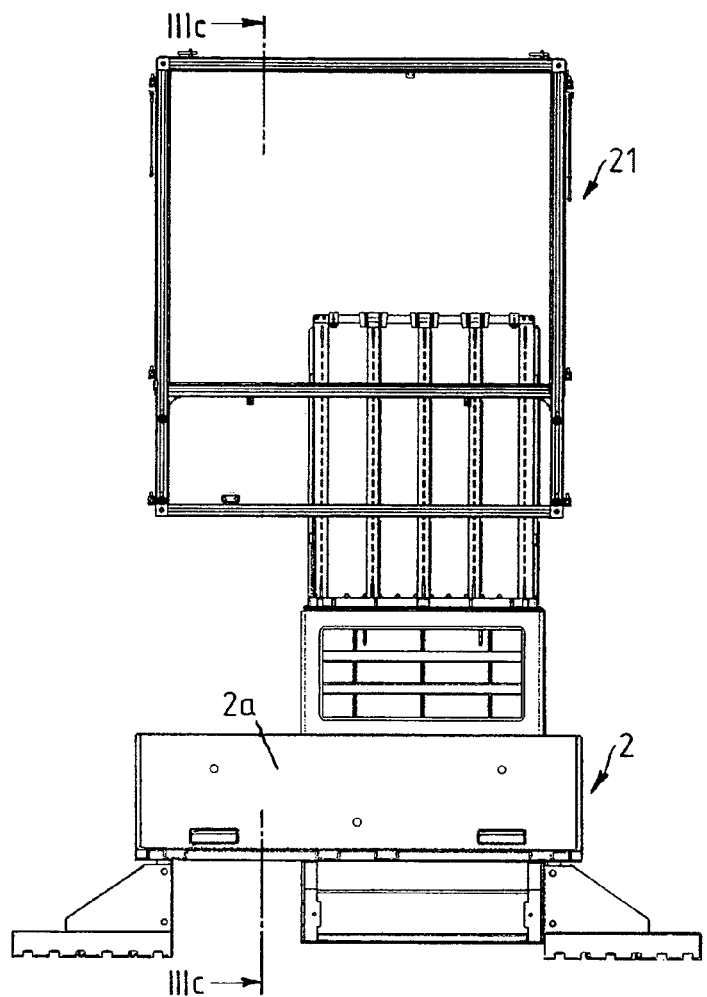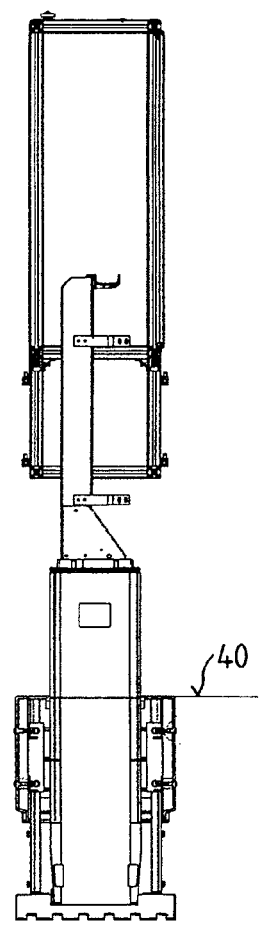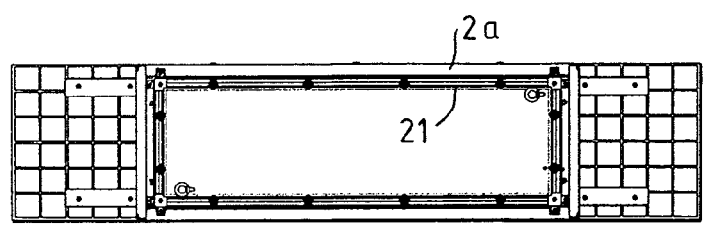

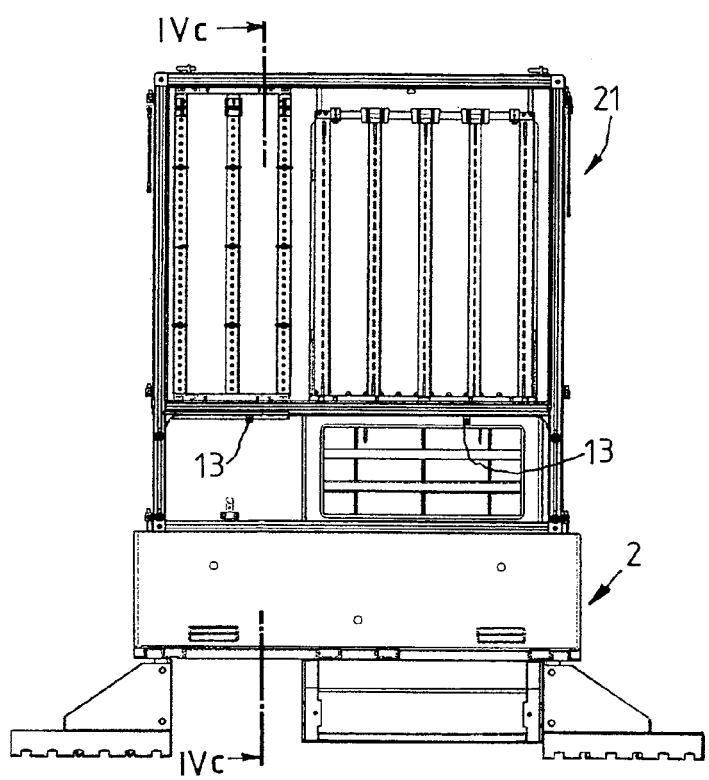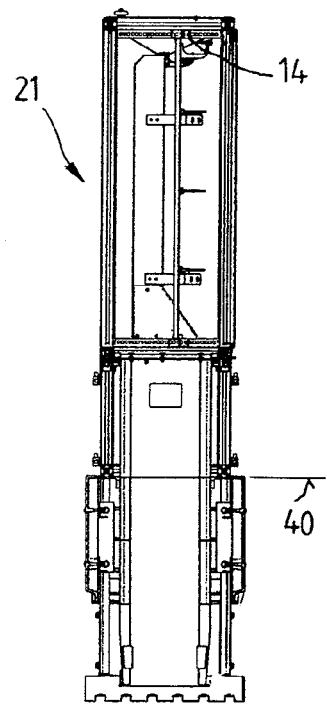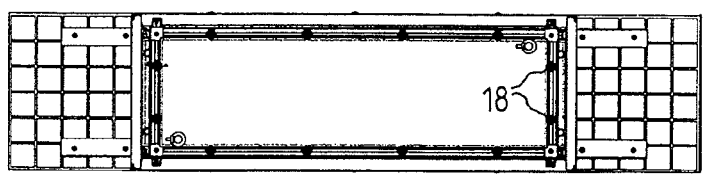

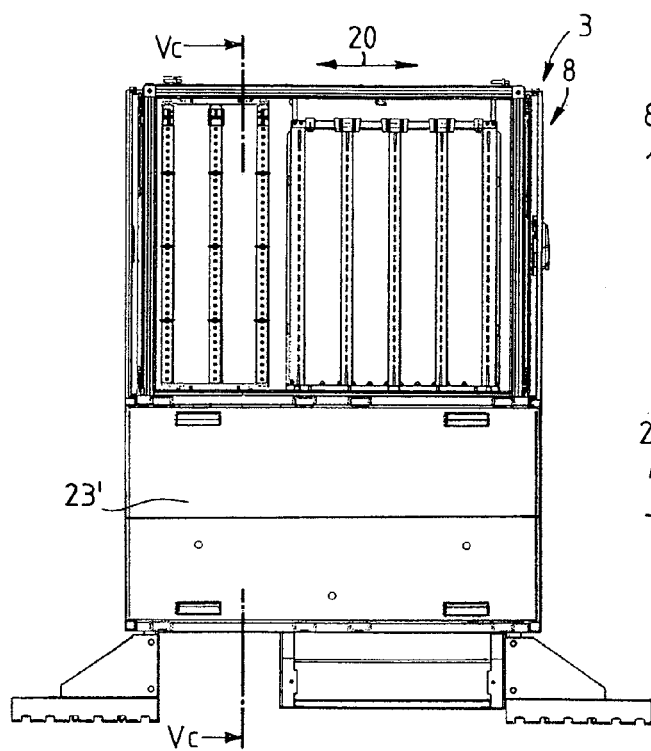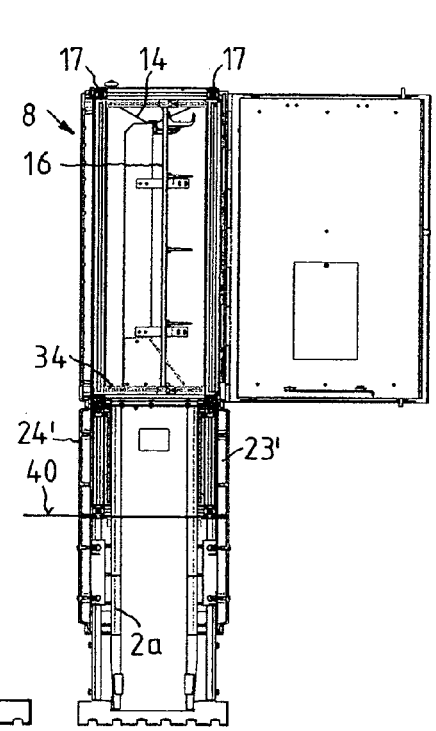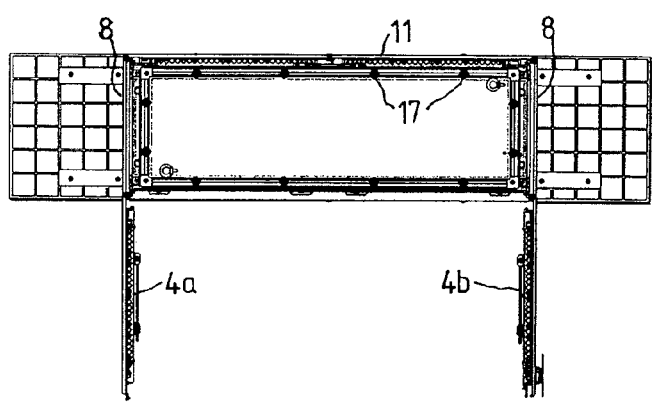

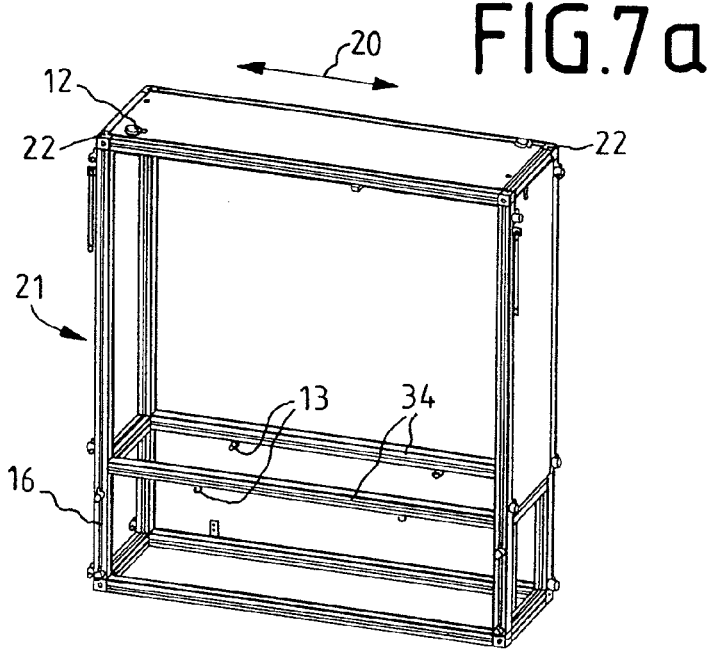
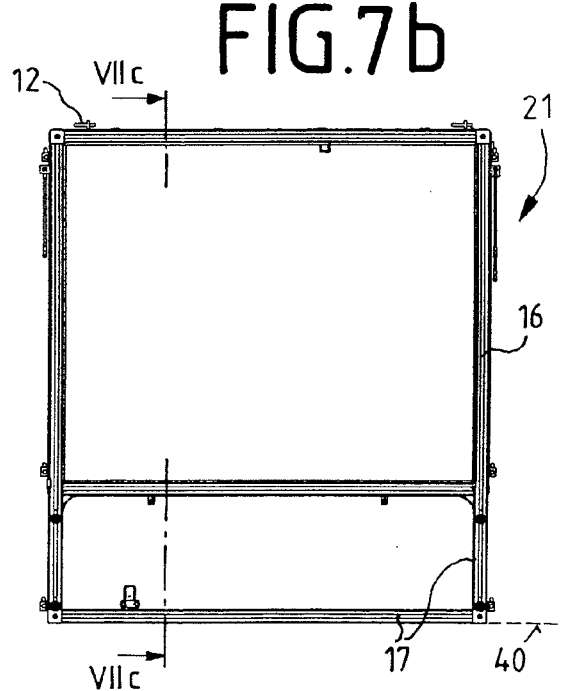
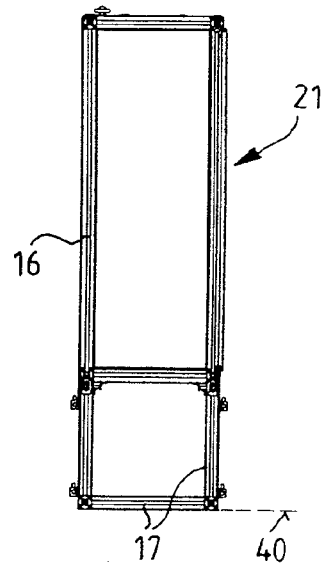
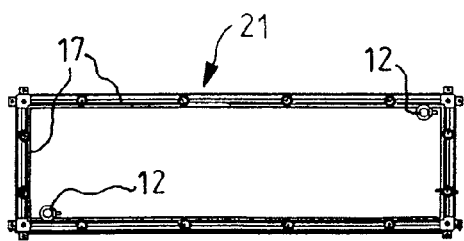

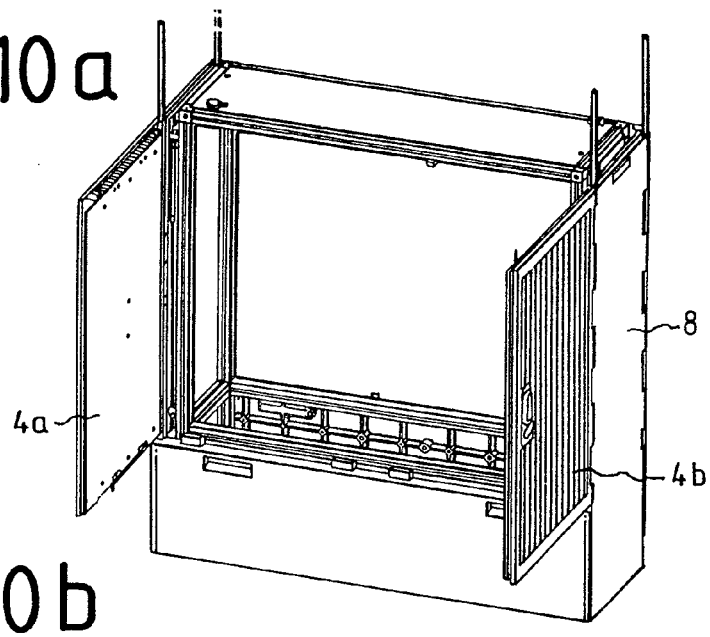
FIG.10a
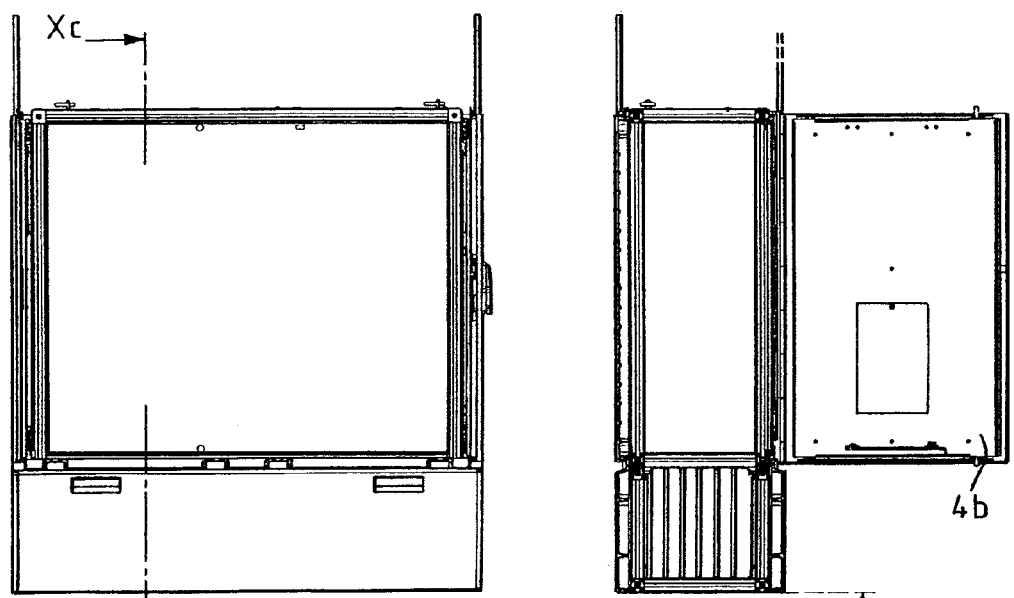
FIG.10b
FIG.10c
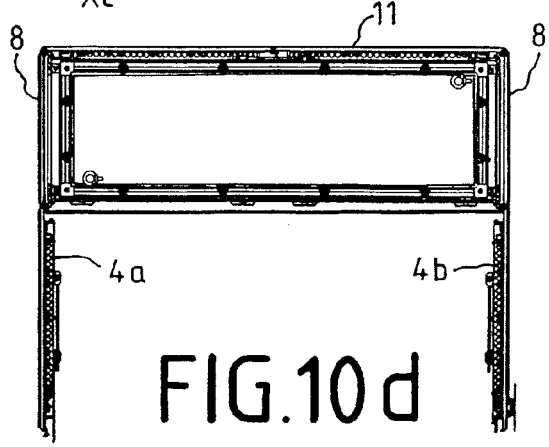
FIG.10d

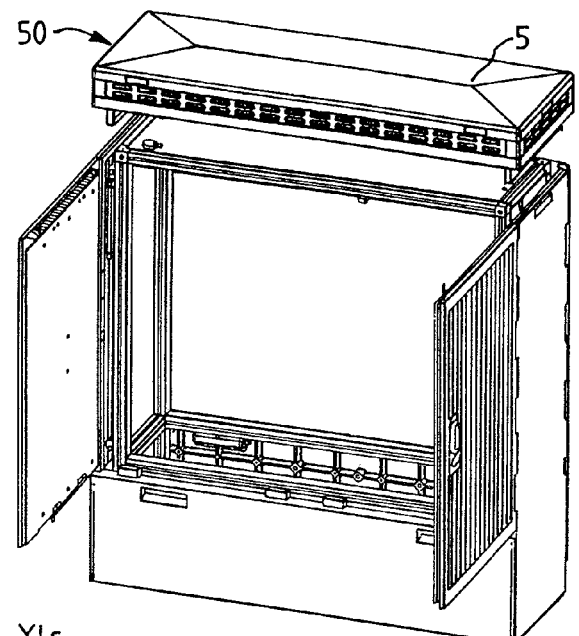
FIG.11a
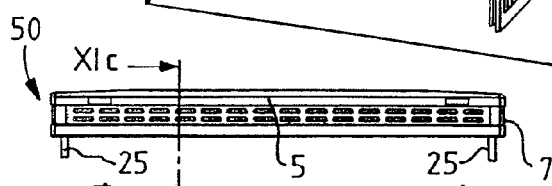
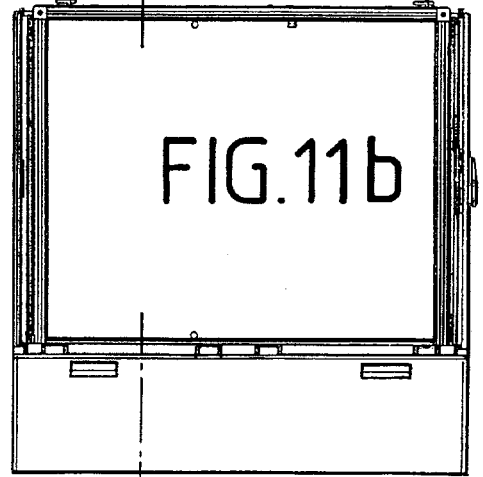
FIG.11b
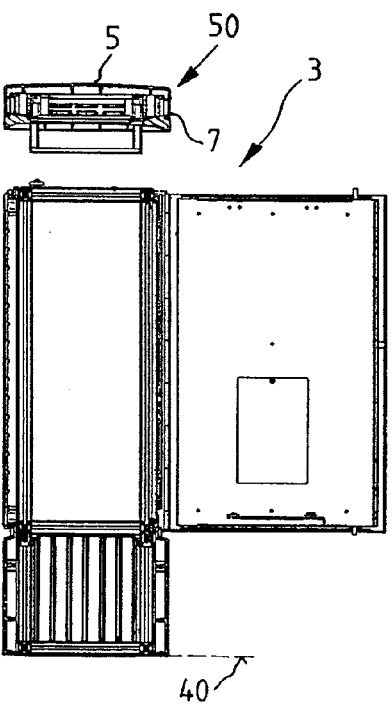
FIG.11c
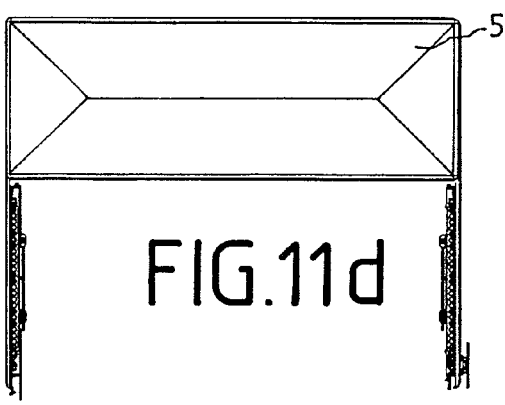
FIG.11d

SLIP-OVER DISTRIBUTION CABINET

This application is a Continuation of U.S. Ser. No. 10/547,069, filed 12 Jun. 2006, now U.S. Pat. No. 7,492,575, which is a National Stage Application of PCT/EP2004/001837, filed 24 Feb. 2004, which claims benefit of Ser. No. 103 07 944.0, filed 25 Feb. 2003 in Germany and which applications are incorporated herein by reference. To the extent appropriate, a claim of priority is made to each of the above disclosed applications.

TECHNICAL FIELD

The invention relates to a distribution cabinet which is usually set up outdoors and accommodates the technical, for example electrical or optical, distribution installations for, for example, weak-current systems, for example telephone systems, with associated power-supply devices and cable-terminal/-connection devices for a certain area.

BACKGROUND

Nowadays—in addition to having sufficient structural stability and resistance to vandalism, etc.—such distribution cabinets have to satisfy further requirements, for example excessive electromagnetic radiation must not be emitted to the surroundings, and, for use in warmer countries in particular, the temperatures in the interior of the distribution cabinet must not rise to too high a level, despite the heat-emitting electrical subassemblies accommodated there, nor must they drop to too low a level.

Such distribution cabinets are, in principle, produced either from metal or from plastic, plastic combining the advantage of less expensive production with the advantage of an electrically non-conductive material, with the result that, even in the case of unplanned contact being established between the housing of the distribution cabinet and an electrical component, there is never the risk of a person who touches the housing from the outside receiving an electric shock.

As far as the sufficient cooling capability of such distribution cabinets is concerned, it is already known for cooling to be effected by air circulation. For this purpose, the body is of a double-walled configuration, the ambient air being able to circulate in the intermediate space between the walls, that is to say enter at the bottom and leave at the top, whereby on the one hand heating-up of the interior by sunlight and on the other hand heat dissipation is effected at the inner wall, which is heated up by the electrical subassemblies in the main space.

In addition, modern distribution cabinets are made EMC-proof, with the consequent result that electromagnetic emission to the outside can only take place within the prescribed limit values.

Some of such distribution cabinets are on private property, but they are often also on public property, so that the respective local authorities have to grant approval for such a distribution cabinet to be installed. As long as the telecommunication companies were also state-owned, this rarely presented any problems; with increasing privatization, the authorities are refusing installation or demand a fee for installation, quite apart from the fact that an approval procedure has to be undergone and takes considerable time.

This problem arises in the case of all distribution cabinets that are to be newly installed, that is to say in particular in development areas, or if there is no longer any space available for technical components, in particular electrical components, in an existing distribution cabinet and a further distribution cabinet should be additionally set up alongside it.

A further, technical problem exists when an existing distribution cabinet is replaced for technical reasons, that is to say for example if the body of an already existing distribution cabinet has to be exchanged to improve the EMC-proof shielding or the cooling capability.

At the same time, it must be remembered that a distribution cabinet generally rests on a base buried deep in the ground, usually made of concrete, latterly also of plastic, into which the buried cables leading to the distribution cabinet and away from it again are led from below, and to which both the usually present installation frame on which the technical components, in particular electrical components, are fastened, is screwed in the same way as the surrounding body. The body is—in particular in the case of the double-shell type of construction mentioned with regard to the inner body—either produced from fixedly interconnected plates, or from a body frame closed by means of paneling. The outer body is fitted on such an inner body at a distance from it by means of paneling.

SUMMARY

It is therefore the object of the present invention to provide a method for exchanging, in particular increasing the size of, the body of a distribution cabinet and also a construction kit for this, the exchange of which body is unproblematic and with which method the distribution cabinet remains at the original location and consequently no new installation approval or construction approval is necessary.

By slipping a new base and also a new body—after removal of the old body—over the old components enclosed by the switch cabinet, that is to say leaving the old base and the transmission equipment mounted on it, that is to say the technical, in particular electrical functional parts, in their place, no disconnection from the power supply system, that is disconnection of the technical, in particular electrical, functional elements, inside the switch cabinet is necessary.

Since the switch cabinet remains in its existing position and only the outside dimensions of the new body increase to a greater or lesser extent, generally no new official installation approval is necessary either.

By removing the ground from around the base, but preferably not quite as far as the lower edge of the old base, not only does the old base remain in its position, but usually it is also not entirely deprived of its stability during the conversion work, with the result that there is no reason to fear that the stripped old switch cabinet may tip over during the work.

However, if need be it is possible at any time for the stripped old switch cabinet to be destabilized deliberately—by removing the ground down to the lower edge of the old base—in order to set it straight again—for example if it is tilted—or else move it slightly from where it is located. The latter is often necessary for example whenever the old switch cabinet was positioned with its rear side too close to an existing building, garden wall or the like, and must be shifted a few centimeters away from there to slip the new switch cabinet over it.

Slipping over the new base box, which is hollow in plan view and preferably in the form of a closed box profile, and in particular the base feet projecting preferably laterally outward from the base box, have the effect of increasing the size of the standing area of the latter in such a way that secure support in the ground is ensured—despite the smaller installation depth.

The base is in this case preferably assembled before it is slipped over, from the usually one-piece, but possibly also multi-part, base box and the base feet, the base feet preferably in turn comprising base-foot side parts and a base-foot plate which is continuous on each side, and consequently for two side parts.

For transport, the base feet are often already fastened to the base box, but turned by 180° with respect to a vertical axis, with the result that the base-foot plate does not project outward beyond the base box. In this transporting position, the base can also be used in the case where a distribution cabinet is newly constructed.

This on the one hand reduces the transporting volume of the base and on the other hand allows the parts to be produced from the most favorable material in each case, for example the base-foot plates from galvanized sheet-steel meshes or plastic meshes, while the base-foot side parts may be bent sheet-steel parts. The base box itself consists for example of concrete, plastic, metal or a mixture of these materials.

The production of the base-foot plates as mesh parts and in particular from plastic has proven to be advantageous for several reasons: on the one hand, the mesh form makes it possible for the base to be vibrated and consequently leveled exactly horizontally in a simple way. If this base-foot plate consists of plastic, apertures and cutouts can be made in a simple way in the plate on site, for example to accommodate cables leading away from the distribution cabinet.

Once the base has been aligned, in particular horizontally, but also approximately in its lateral distance from the old base, placement of the new body on the new base takes place in that the new body is raised by a crane, in particular the loading crane of the delivery truck, by means of lifting lugs screwed into the body, and slipped from above over the electrical components enclosed by the old switch cabinet—which has been freed of its old housing—and also over its base, since the new base generally rises up less far than the old base, with the result that the new body also extends vertically over part of the old base. Generally, further work will necessitate removal of the outer cladding of the new body, that is to say of the outer side walls, rear wall and doors, which, depending on the size and weight of the new body, can take place before or after it is slipped over.

By contrast, the removal of the roof module, usually comprising an upper cover and an upper intermediate part located under said cover, which rests on the intrinsically stable main part of the new body, is generally essential, since, for the slipping-over operation, the lifting lugs for attaching the crane are screwed into this main part of the new body from above, or fastened in some other way.

For this purpose, when the new body is delivered, the roof module is only loosely in place and not already fixedly connected to the rest of the body.

After connecting, in particular screwing, the new body to the new base, in particular the lower edge of the new body to the upper edge of the new base, the new body—and consequently also the new base already connected to it—is brought to the desired distance from the old base in the horizontal direction, preferably by means of horizontally lying adjusting screws in the new body.

For this purpose, the body, and in particular the body frame of the new body, has horizontally running cross struts just below the height of the upper edge of the body, to which or through which, by means of horizontal threaded bores, the adjusting screws can be screwed from outside and support themselves on the outer surface of the old base.

Preferably, the old installation frame, on which the transmission equipment is mounted, is also detached from the old base, in particular by unscrewing or extracting the connecting screws, and instead fixed, in particular screwed, with respect to the new body.

This takes place for example by means of the known perforated strips of metal or plastic, which on the one hand are screwed to the old installation frame, and on the other hand to the new body on the inner side, in particular to the body frame of the latter. For this purpose, sliding blocks in undercut grooves, which run along the edge profiles of the body frame, can be screwed in particular to such a body frame.

Such fixing preferably takes place in the upper region of the old installation frame and, if appropriate, in its lower region. The use of the perforated strips allows different forms and positions of the old installation frames to be fastened to the new body.

In addition, the EMC-proof shielding is achieved, in that the gap between the old base and the new body, which is peripheral when considered in plan view, is closed by an EMC seal—acting on the upper side of the old base.

If the new body surrounds the old base only at a small distance, this takes place by adhesively attaching a strip of metal foil, for example a bitumen strip covered with aluminum foil, which rests with its one edge on the upper side of the old base and with the other edge on the cross struts extending at this height of the body frame of the new frame.

If the new body serves for increasing the size of the interior space for new technical or electrical components, the then larger open surface area next to the old base is closed by means of a corresponding plate consisting of metal or covered with metal.

In the additional interior space there is already—preferably already connected to the new body and in particular the body frame of the latter—a new installation frame for receiving the new electrical components.

Finally, the new body, previously stripped of its cladding for better accessibility, is provided with panels again, that is to say the side walls are suspended from the top on the outside, and so is the rear wall, and the folding doors are fitted by pushing in from the top the hinge rod which extends over the entire height of the door and is passed through both by hinge lobes of the side part and by hinge lobes of the door.

In this respect, care must be taken in particular not to damage the peripheral, combined splash-water and EMC seal, arranged in the doors and/or in the housing frame, which preferably consists of a customary soft plastic or rubber material, preferably of a hollow cross section, as the splash-water seal, and on the outer surface of which a metallized foil, or a foil that contains a metal gauze and is preferably self-adhesive, is applied as the EMC seal.

Finally, the roof module is placed on, positively engaging with its lower edge over the upper edge of the side walls and rear wall. The roof module in this case reaches down with securing continuations, which have a transverse bore, between the housing frame and the outer side wall. The roof module is secured against lifting off when the doors are fully opened, in that a securing bar is respectively pushed in horizontally from the front in the intermediate space between the housing frame and the side wall of the housing in such a way that it positively engages through both the bores of the securing continuations of the roof module and corresponding bores of analogous securing continuations projecting outward from the housing frame. After closing and barring the doors, this securing bar is no longer accessible from the outside, consequently cannot be removed, in order that the roof module is not taken off, and as a consequence the side walls and the rear wall are also not detached upward, and—as long as the lock is not destroyed—the front doors are not opened either.

BRIEF DESCRIPTION OF THE DRAWINGS

An embodiment according to the invention is described in more detail below by way of example. In the drawing:

FIG. 3 shows the slipping-over of the inner body,

FIG. 6 shows the roof module additionally placed on;

FIG. 7 shows the inner body on its own,

FIG. 10 shows it with an additionally attached rear wall and front doors, FIG. 11 shows it with the roof module to be additionally placed on, FIG. 12 shows it in the ready assembled state of the body;

DETAILED DESCRIPTION

Figure 1A:
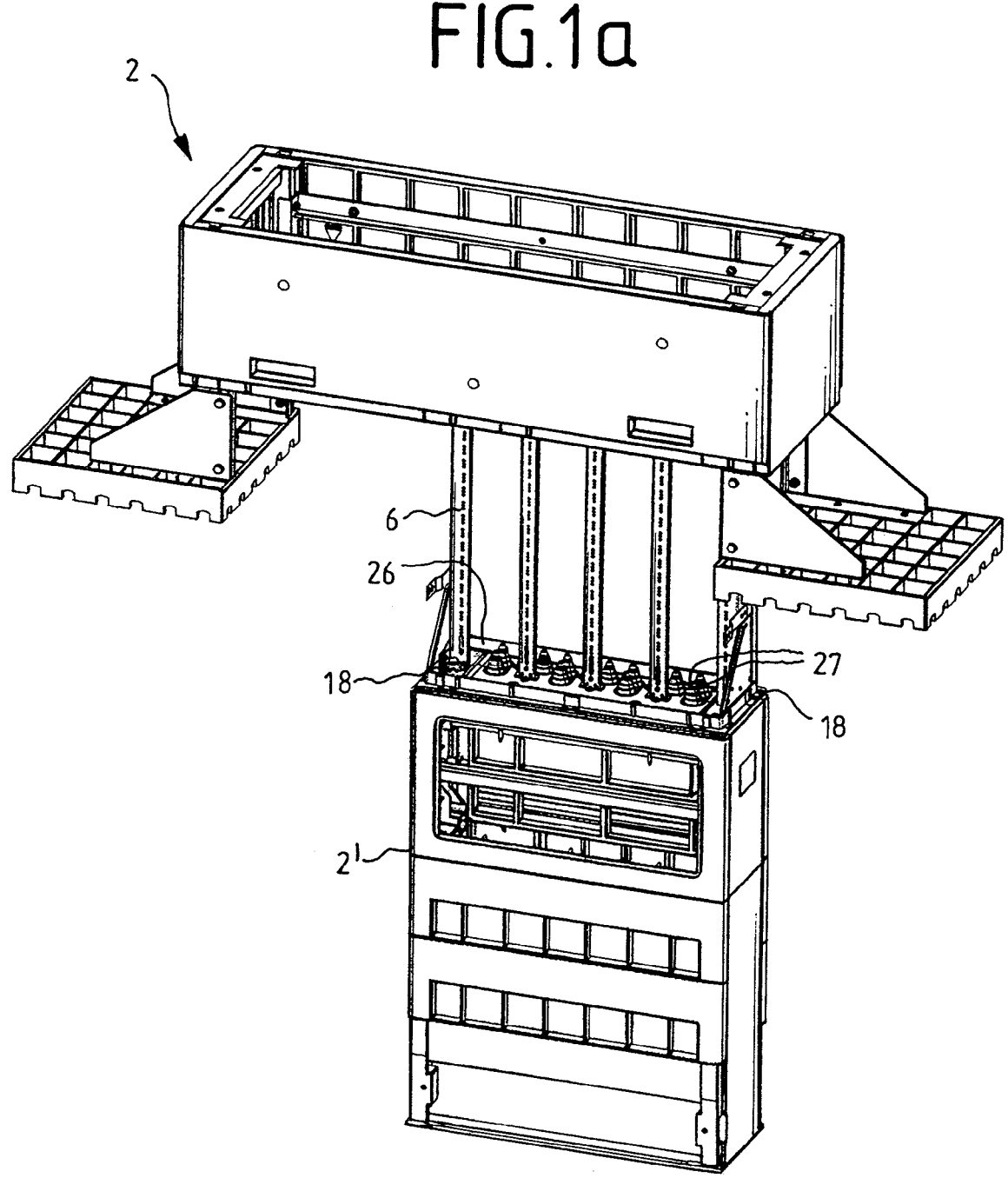
FIG. 1 shows the slipping-over of the new base.

Before the procedure involved in slipping over the new distribution cabinet is explained on the basis of FIGS. 1 to 6, its individual parts, namely the new base 2 and the new body 3, are described individually on the basis of FIGS. 7 to 13, and the different states of construction of the new body 3 are thereby explained on the basis of FIGS. 7 to 12.

FIG. 13 shows the new base 2, which is screwed together from a number of individual parts:

On the one hand, the base box 2a, which is hollow, that is to say open right through when viewed in plan view, and generally consists of plastic, concrete, a mixture of the two or some other non-rusting material. Fastened under its outer side regions in the transverse direction 20, of the greater transverse extent of the base box 2a, are base feet 2b, with which the base box 2a is set down on the underlying ground, which is removed for this purpose down to the desired level.

The base feet 2b comprise base-foot plates 2d, preferably made of an intrinsically stable mesh, in particular a mesh of galvanized sheet steel with vertical ridges or a plastic mesh. These plates have a width preferably corresponding exactly to the horizontal depth, that is width, of the base box 2a and project laterally beyond the base box 2a in the transverse direction 20. When viewed in plan view, the plates 2d reach only under the side walls of the base box 2a, in a way corresponding to the thickness of said walls, with the result that the free space in the base box, when viewed in plan view, is not made any smaller by this.

The plates 2d are fastened in this position with the aid of in each case two approximately triangular side parts 2c, which are screwed by one of their two right-angled outer edges to the plate 2d, in particular to the upper side of the latter, and are connected by the tapering upper region to the base box 2a and in this way position the plates 2d underneath the base box 2a and at a distance from it.

The plates 2d serve for increasing the size of the standing area with respect to the base area of the peripheral parts, only narrow in plan view, of the one-piece or vertically or horizontally divided, multi-piece base box and can theoretically also project outward at the front and rear sides instead of at the outer narrow sides in the transverse direction, or on all four sides. However, the result of a standing area of optimum size with only relatively little necessary excavation of the earth around the old base is obtained when the plates are fastened such that they project in the transverse direction beyond the sides of the base box 2a.

FIGS. 7 to 12 show the increasingly completed construction phases of the new body 3. The inner body has a cubic form and is intrinsically stable on account of a body frame 16 which is made up of edge profiles 17, which are interconnected, in particular screwed, at their ends, in particular in the corners of the body frame 16, by means of corresponding corner connectors.

In addition to the edge profiles 17, cross struts 34 run horizontally along the edges of the cuboidal inner body 21 around the periphery between the vertical struts in the lower third of the body frame 16, and adjusting screws 13 are likewise arranged horizontally, directed from the outside inward against said cross struts.

The adjusting screws 13 are in this case arranged in pairs, spaced apart from one another, respectively on the front and rear cross struts 34 running in the transverse direction, preferably also one each in the middle of the short cross struts running transversely in relation to the transverse direction 20.

The body frame 16 is closed at the sides, at the rear side and at the upper side by preferably EMC-proof plates, which preferably lie in the range of the thickness of the edge profiles 17, so that only the front side, in particular in this case only the region lying above the cross struts 34, is open, as well as the base area between the edge profiles 17 running around the periphery at the bottom.

Shown lying on the upper paneling are two screw-in lifting lugs 12, which if need be, that is for lifting this inner body 21, can be screwed into upwardly directed internal threads 22 that are open at the top of two diagonally opposite upper corner connectors of the body frame 16.

Figures 8A, 8B, 8C, 8D:
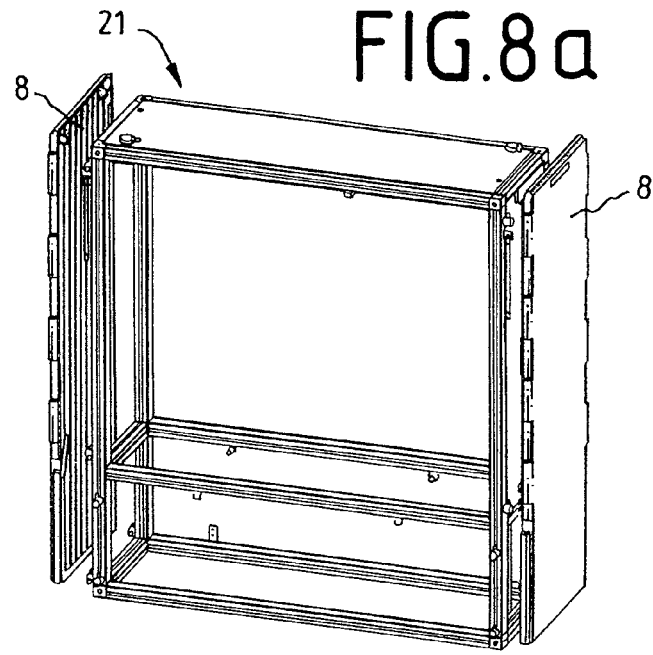
FIG. 8 shows it provided with side parts.
Figure 9A:
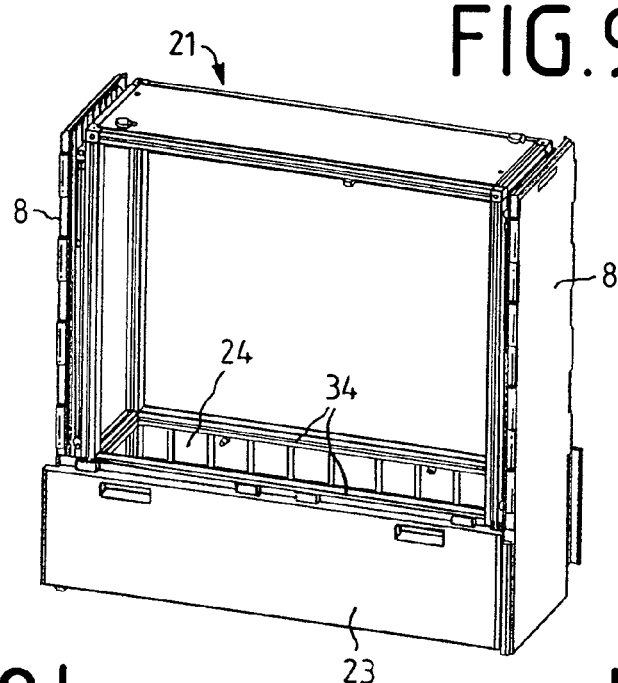
FIG. 9 shows it with additional cladding at the front and rear in the lower region.
Figure 9B:
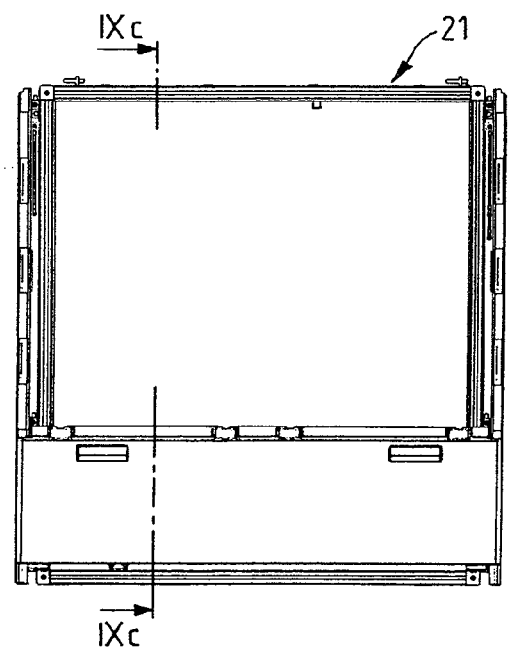
Figure 9C:
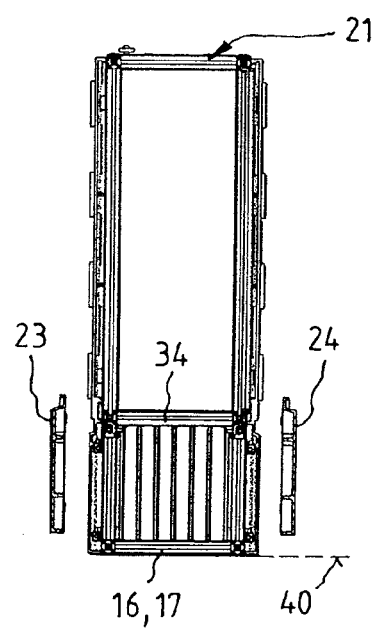
Figure 9D:
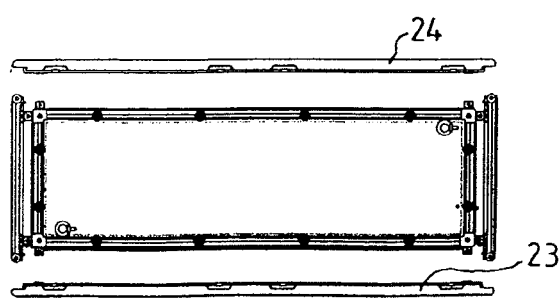
Figure 12A:
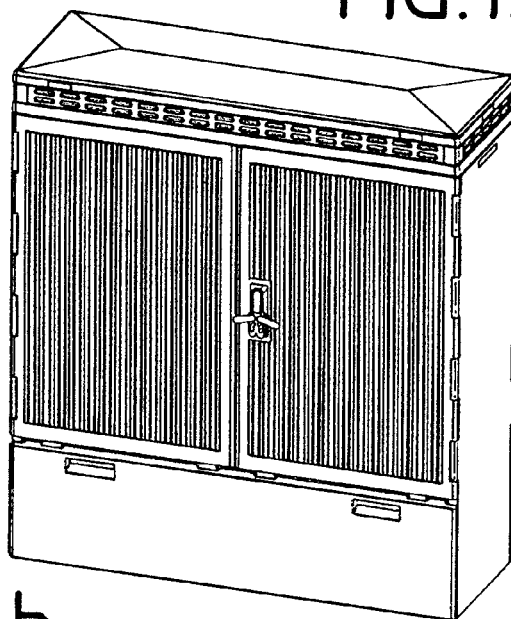
Figure 12B:
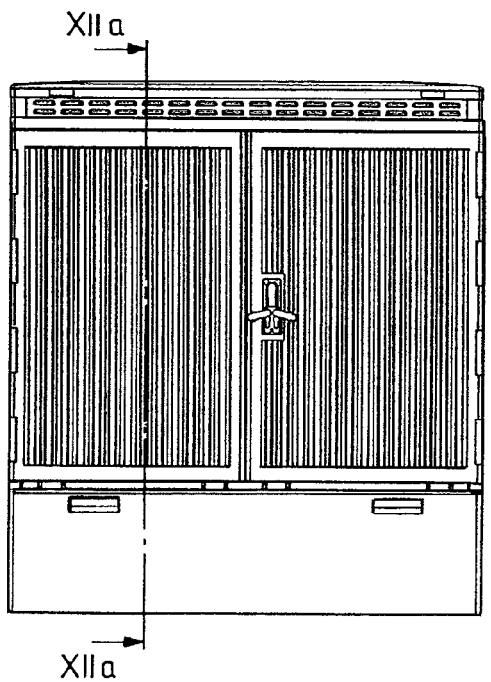
Figure 12C:
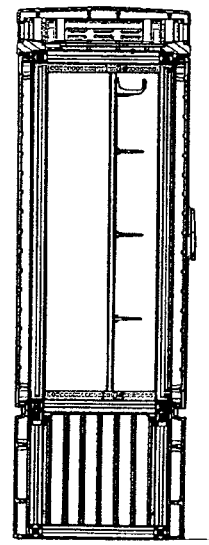
Figure 12D:
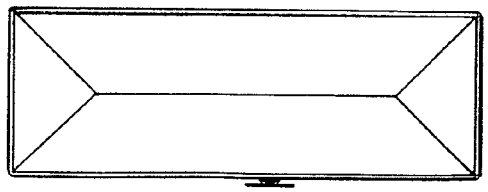
Figure 13A:
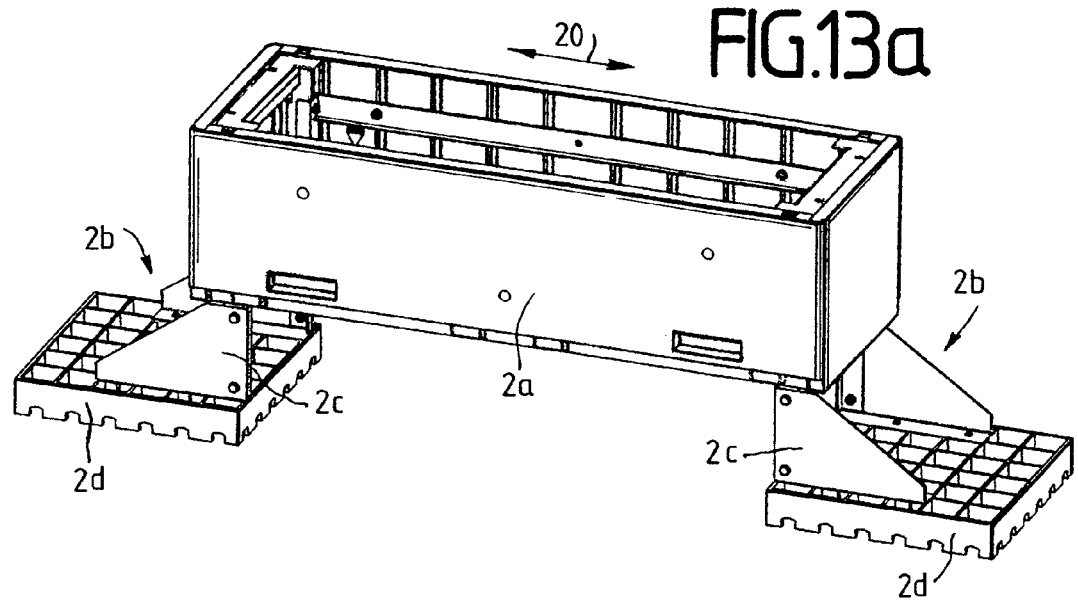
FIG. 13 shows the base on its own.
Figure 13B:
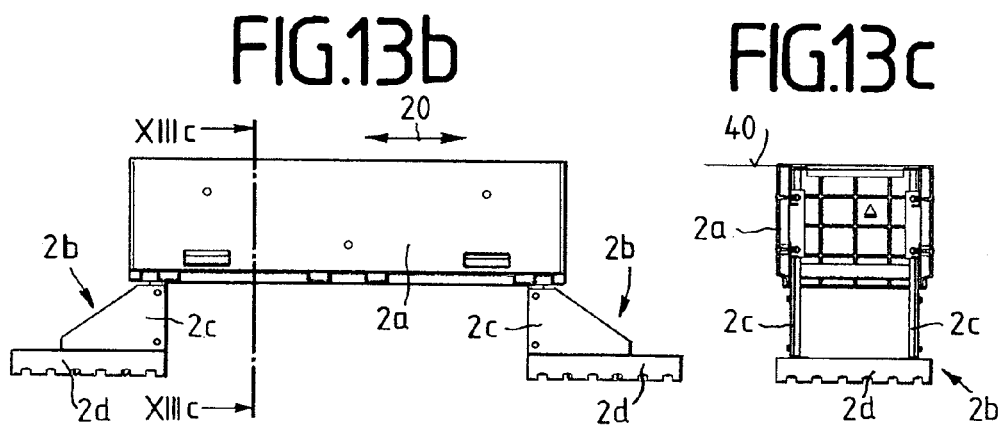
Figure 13C:
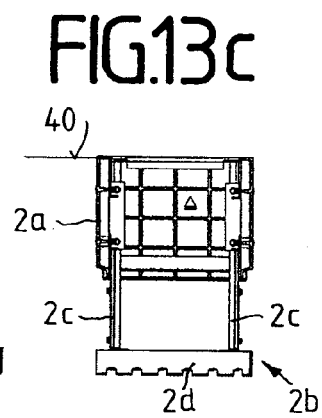
Figure 13D:
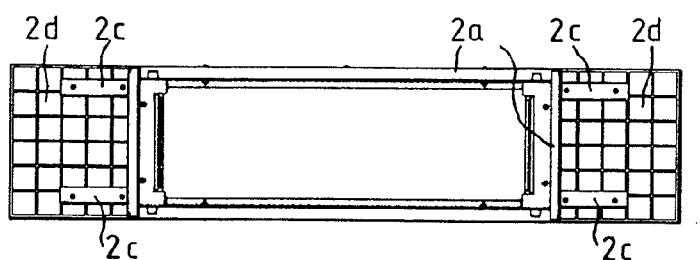
Figure 14C:
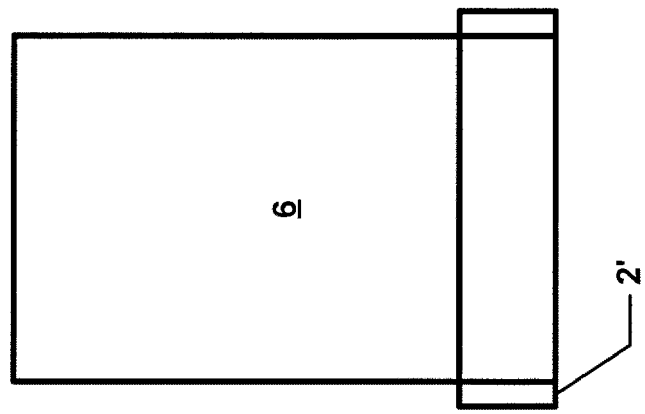
FIG. 14c shows the first distribution cabinet after the first body has been removed.
Figure 14B:
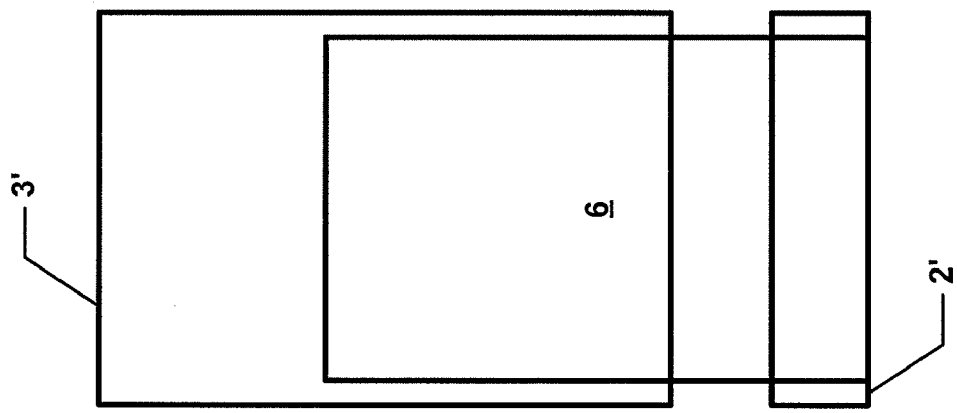
FIG. 14b shows the first body being removed from the first distribution cabinet.
Figure 14A:
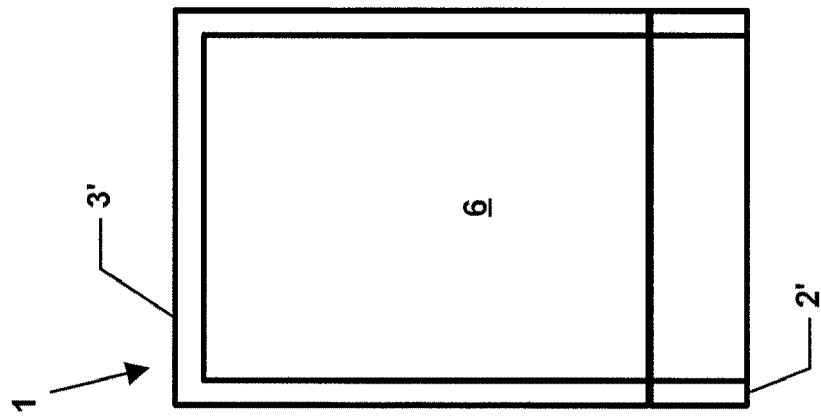
FIG. 14a is a schematic diagram showing a first distribution cabinet including a first base, a first body, and a first installation frame.

FIGS. 8 show by contrast a state in which the inner body 21 as described is already fitted with side walls 8, which are placed from the outside against the side faces of the inner body 21 and by lowering are positively connected to the latter, or fastened in some other way.

FIG. 9 shows a state in which, by contrast with the fittings according to FIG. 8, a front flap 23 and a rear flap 24—which like the side walls 8 and the rest of the cladding preferably consist of plastic—cover the front and rear lower regions the inner body 21, in that they are likewise placed from the outside against the latter, preferably with positive engagement, or fastened in some other way and, as a result, close at the front and rear the region from the peripheral cross struts in the lower third to the lower end of the body frame 16, whereas the side walls 8 of course preferably extend over the entire height of the body frame 21.

FIG. 10 show a state in which the inner body 21 is additionally fitted with a rear wall 11 and front doors 4a, b. The doors 4a, b are in this case hung in corresponding hinges as a pivot axis on the longitudinal outer edges of the front side, while the rear wall 11 is in turn fastened from the outside by hanging from above or in some other way.

As the plan views 10d and 9d show in particular, the rear wall 11 and side walls 8 are positioned such that they are offset by a distance outward with respect to the inner body 21—open at the top and bottom—, so that air can flow upward in between as a result of the chimney effect.

For the same reason, the doors 4a, b are formed in a double-walled manner with through-openings from the bottom to the top, the inner wall of the doors 4a, b in turn preferably being formed in an EMC-proof manner.

FIG. 11 show the state of the body 3 during completion by placing on the roof module 50, which comprises an upper intermediate part 7 and a cover 5, and preferably downwardly protruding continuations 25 serve for pushing into the remaining body 3, in particular between the inner body 21 and the outer cladding of the latter, and screwing to the inner body 21, in particular its body frame 16.

Since the roof module 50, when viewed in plan view, protrudes beyond the inner body 21 and also covers the rear wall 11, side walls 8 and the doors 4a, b in the closed state, the fixed roof module 50—as shown in the final state of FIG. 12—prevents these parts from being raised upward and consequently prevents their removal from the inner body 21.

FIG. 1 show the pushing of the base 2, represented in FIG. 13, over the old installation frame 6, loaded with technical or electrical functional parts, and the old base 2', which supports said frame and to which it is connected by means of fastening screws 18.

The technical or electrical functional elements usually screwed and wired to the old installation frame 6 are not shown for reasons of overall clarity, but instead just the cable inlets 27 in the base plate 36 of the installation frame 6 are shown for reasons of overall clarity. However, when viewed in plan view, the electrical functional parts that are not shown do not protrude laterally beyond the base area of the old base 2', since, before the removal of the old body 3', which rested on the outer periphery of the old base 2', they were of course enclosed by said old body.

Figure 2A:
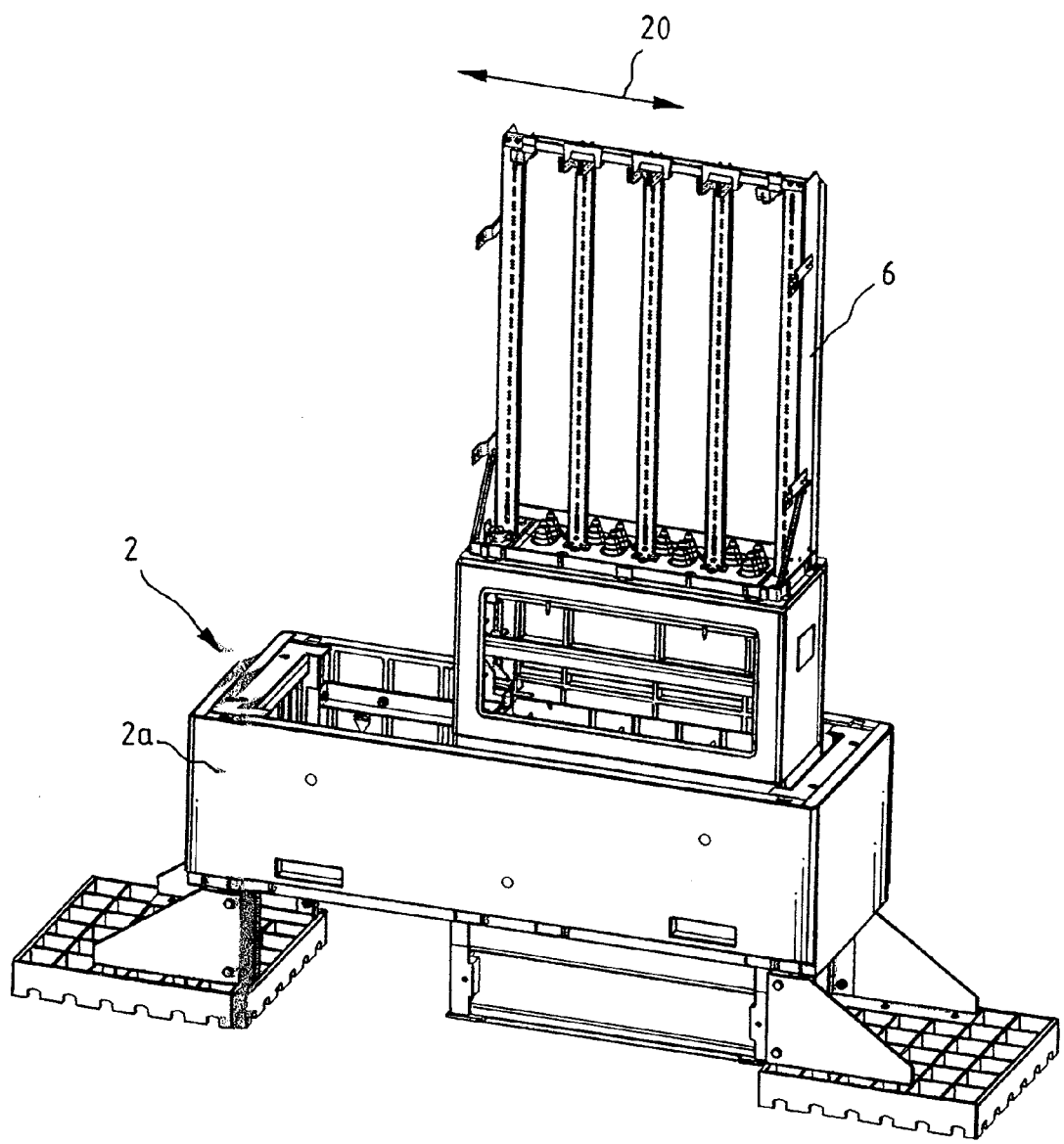
FIG. 2 shows the slipped-over, set-down new base.

FIG. 2 show the final position of the new base 2, set down on the underlying ground, after it has been slipped over. As FIG. 2b shows in particular, the new base 2 is much less high than the old base 2'. Since the ground level, that is to say the normal level of the ground surface, can be seen on the old base 2', the ground is removed around the old base 2', in particular in the transverse direction to the sides of the old base 2', to such a depth that the new base 2 can be placed in the removed region with its standing plates 2d on the new standing level 29 created in this way, which is chosen such that the upper edge of the new base 2 is at the height of the previous ground level 40.

Depending on the depth of submergence of the old base 2', this new standing level may lie, as shown in FIG. 2, just beneath the standing level of the old base 2' or else above it, the new standing level 29 preferably being chosen such that it is above the old standing level, in order not to have to dig around the old base 2' until it is completely free, which reduces the stability of the old base 2', and consequently of the old switch cabinet, during the conversion work.

At the same time there is the possibility of varying the height of the new base 2 by means of base side parts 2c of different heights.

The plan view of FIG. 2d also shows that the width of the new base, when viewed in plan view, that is to say transversely in relation to its transverse extent 20, is only of such a size that the inner, free space of the new base 2 that can be slipped over, that is to say in particular its base box 2a, is just slightly greater than the outer width of the old base 2'.

In the transverse direction 20, the new base 2 may likewise just fit over the old base 2' or—as shown in FIG. 2—be much larger, in order to create space for the new installation frame next to the old installation frame 6 at a later time. For this reason, the new base 2 is then slipped over the old base 2' in such a way that the latter bears with one of its sides closely against the lateral (right or left) inner periphery of the new base 2, in particular its base box 2a, and the additional interior space is consequently available only on one side of the old installation frame 6, that is in one piece.

Once the new base 2 has been set down and aligned horizontally at the correct height in this way, the body 3, in particular only its inner body 21—preferably hanging from a crane hook—is slipped from above over the old installation frame 6, so that the latter is completely surrounded by the new inner body 21. The body 3, in particular its inner body 21, is thereby lowered until it rests on the upper side of the new base 2, and subsequently screwed to the latter by means of fastening screws 18.

Preferably—when viewed in plan view—the inner body 21 does not in this case protrude laterally beyond the outer periphery of the base box 2a, as can be seen from FIG. 4, after fastening by means of the fastening screws 18 between the inner body 21 and the new base 2.

FIG. 5 shows the state of the new body 3 analogous to FIG. 10, that is to say with fitted outer cladding on the inner body 21 in the form of the side walls 8, the rear wall 11 and the two outer-attached front doors 4a, b. As the front view of FIG. 5b and the plan view of FIG. 5d show in particular, the outer periphery of the new body 3 fitted out in this way is greater than the outer periphery of the new base box 2a, so that the side walls 8 extend over the entire height of the inner body 21 and of the base box 2a, and also the front flap 23' and the rear flap 24' that are used cover in terms of height not only the lower region of the inner body 21, that is to say from the cross struts 34 downward, but also the part lying thereunder of the new base box 2a.

Figure 4A:
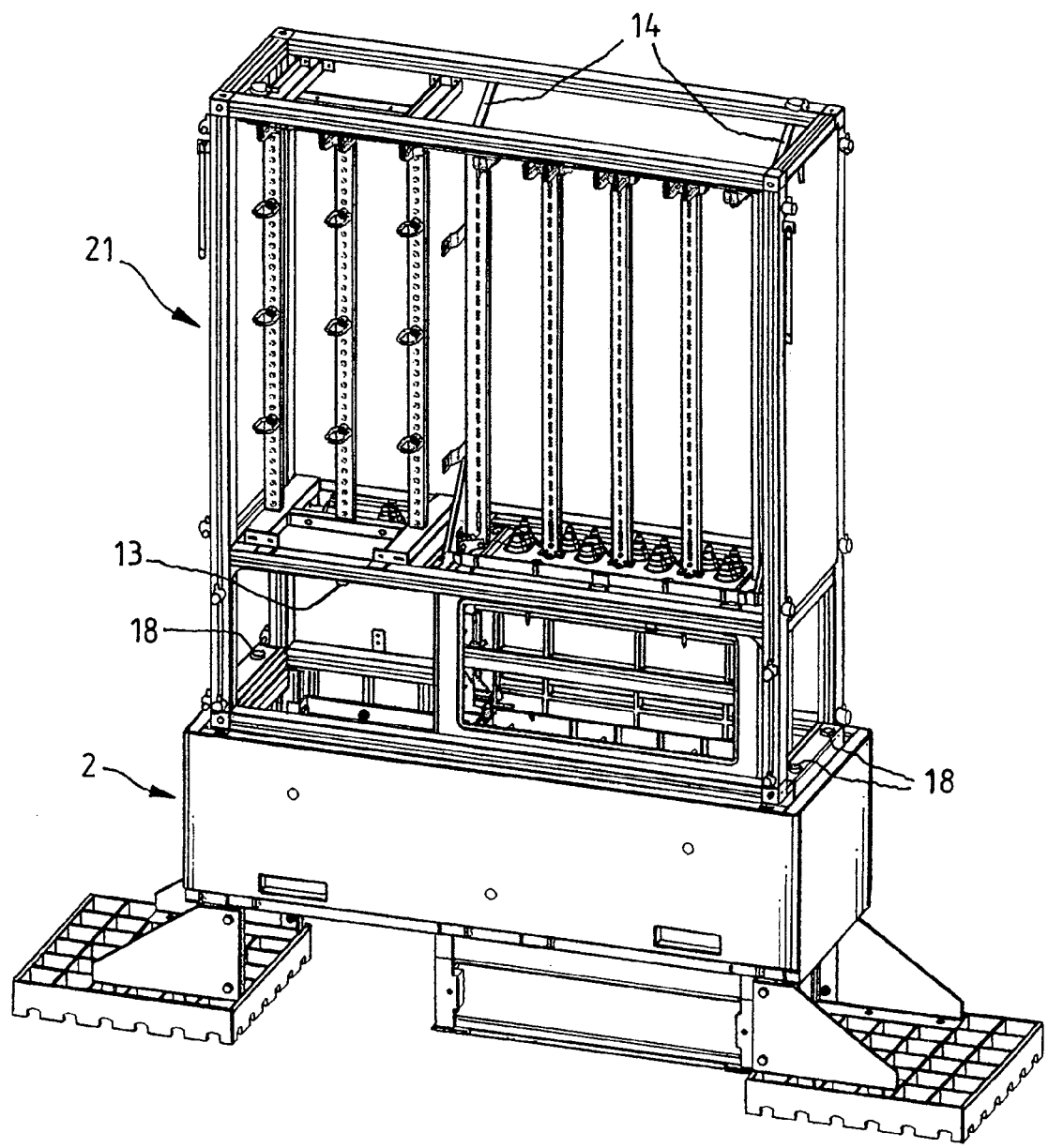
FIG. 4 shows the slipped-over, set-down and fastened inner body.
Figure 5A:
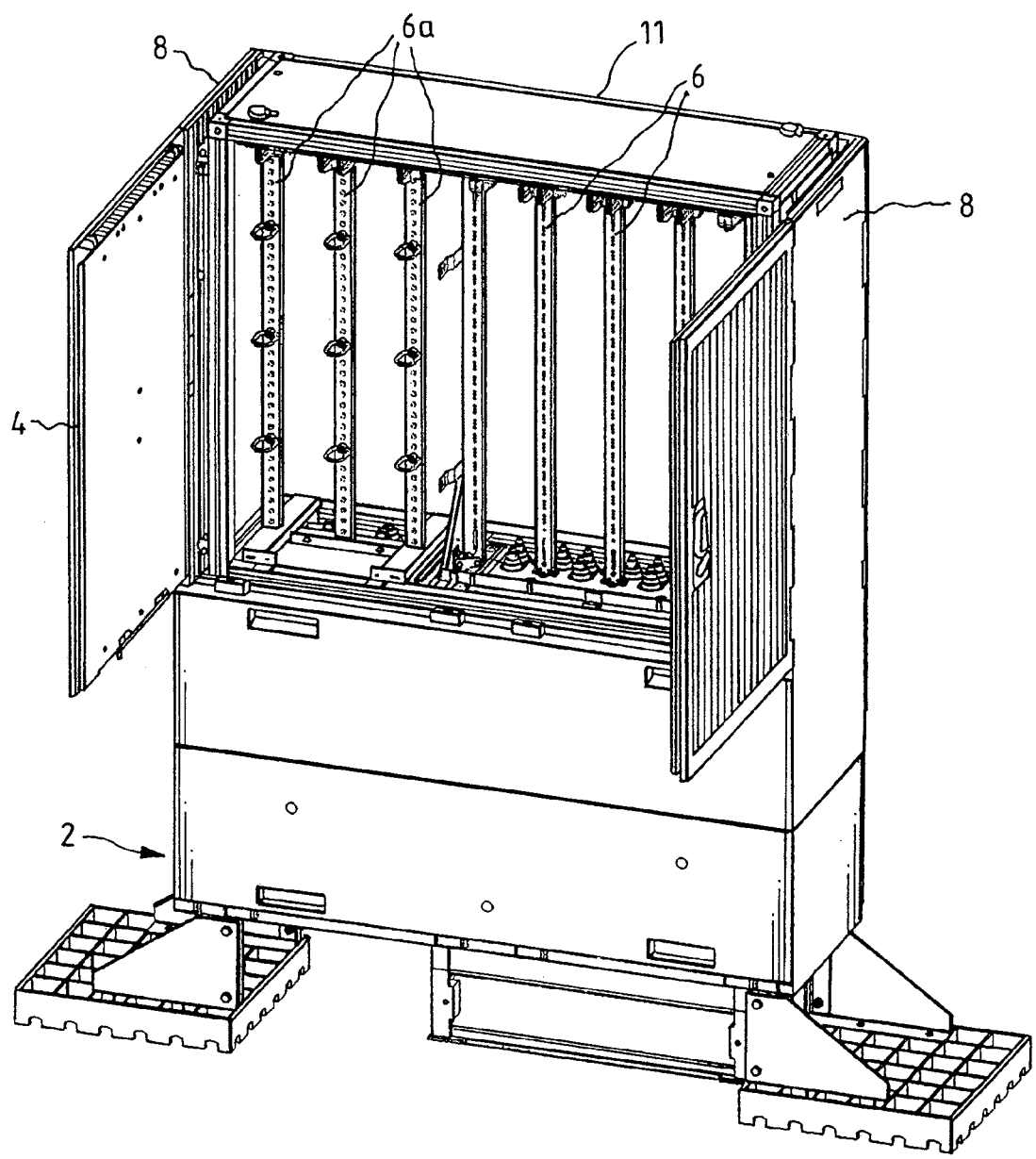
FIG. 5 shows the inner body provided with peripheral cladding plates.
Figure 6A:
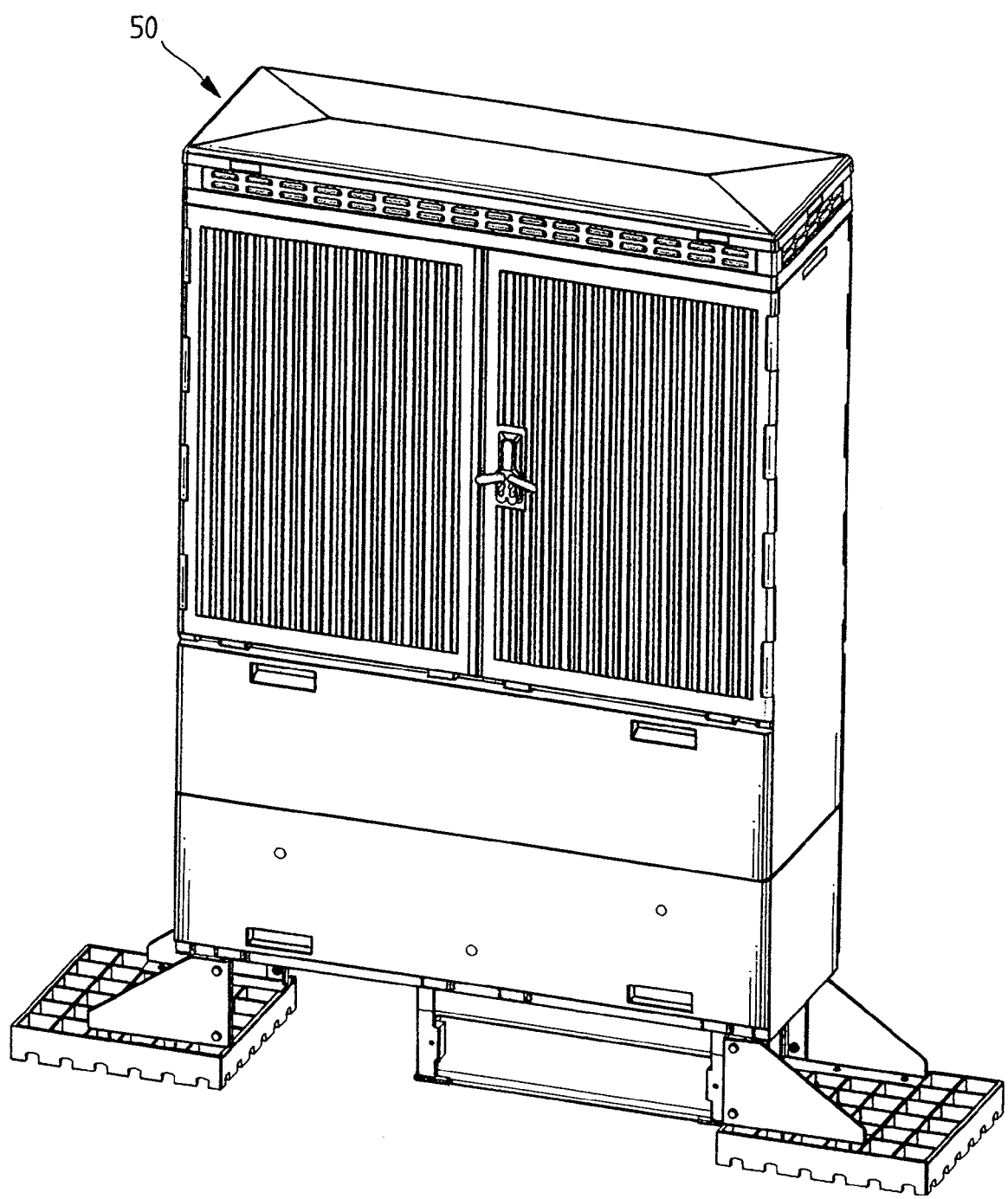
Figure 6B:
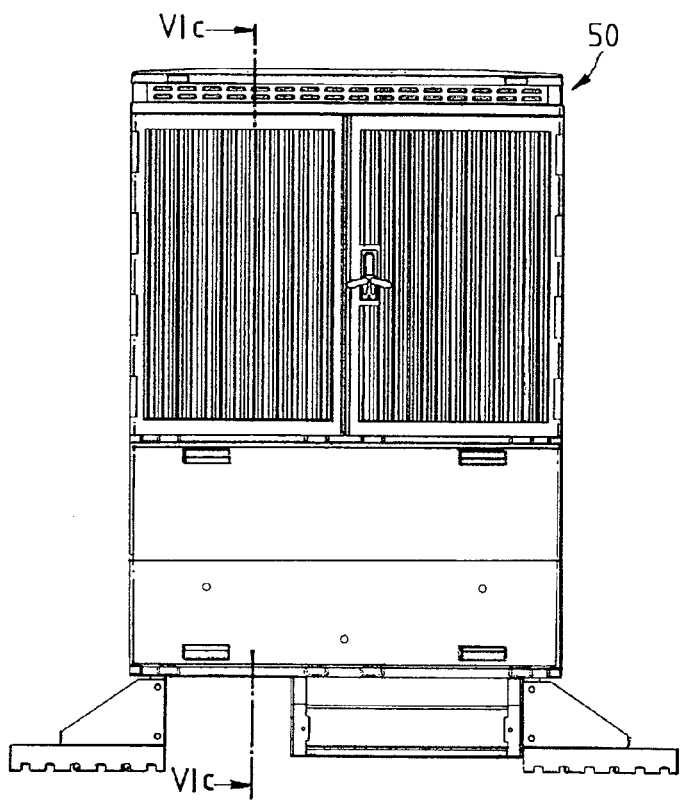
Figure 6C:
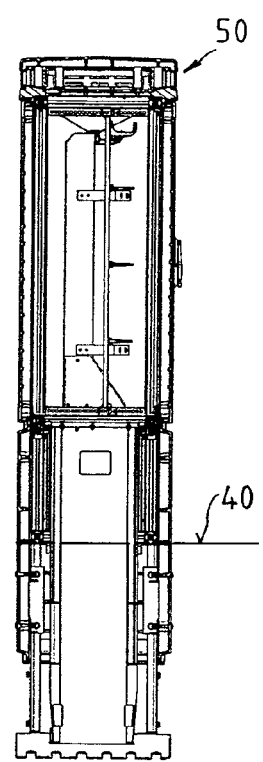
Figure 6D:
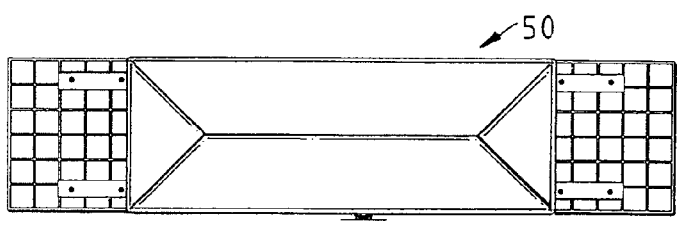

FIG. 5a also shows the new installation frame 6a, which is fastened subsequently such that it laterally adjoins the old installation frame 6 in the inner body 21 of the new body 3, which according to FIG. 4a may take place already before the slipping-over of the new inner body 21 or of the new body 3, or else subsequently.

Similarly—as a departure from FIGS. 1 to 6—the inner body 21 may be slipped over when already paneled with side walls, a rear wall and a front flap and rear flap, that is to say in the state which can be seen in FIG. 5.

FIG. 5, in particular FIG. 5c, also show the fixing of the old installation frame 6, in particular in the upper region—to the new body 3, which preferably takes place by means of screwing a piece of perforated strip 14, which preferably consists of metal or plastic, the middle region of which is screwed to the upper end, for example, of the old installation frame 6, and the ends of which that point obliquely upwards to the front and rear are screwed to the front and rear edge profiles 17, running in the transverse direction 20, of the body frame 16, preferably by screwing to sliding blocks 17, which are displaceable in corresponding undercut grooves along these edge profiles 17.

FIG. 6 bears the final state, that is to say—once the lifting lugs 12 have been removed again—after placing the roof model 50 onto the upper side of the remaining new body 3 and connection to the latter.

LIST OF DESIGNATIONS 1 distribution cabinet
2, 2' base
2a base box
2b base foot
2c base side part
2d base plate
3, 3' body 4 door
5 cover
6 installation frame
7 upper intermediate part
8 side wall
9 subrack
10 vertical longitudinal direction
11 rear wall
12 lifting lug
13 adjusting screw
14 perforated strip
15 sliding block
16 body frame
17 edge profile
18, 18' fastening screw
19 metal foil
20 transverse direction
21 inner body
22 internal thread
23, 23' front flap
24, 24' rear flap
25 continuations
26 base plate
27 cable inlet
28 lines
29 new standing level
34 cross struts
40 ground level
50 roof module

The invention claimed is:

1. A method for upgrading a first distribution cabinet to a second distribution cabinet, the first distribution cabinet including a first base, a first body, and a first installation frame loaded with electrical components, the first base being seated at a first ground level, the method comprising:
removing the first body from the first base and the first installation frame without disconnecting the electrical components loaded on the first installation frame;
slipping a second base over the first installation frame and the first base;
slipping a second body over the first installation frame, the second body having at least as much interior space as the first body;
seating the second body on the second base; and
seating a roof module on the second body.

2. The method as claimed in claim 1, further comprising:
removing ground from around the first base to reach a second ground level before slipping the second base over the first installation frame and the first base; and
seating the second base at the second ground level after slipping the second base over the first installation frame and the first base.

3. The method as claimed in claim 1, further comprising coupling a second installation frame to the first installation frame.

4. The method as claimed in claim 3, further comprising installing additional electrical components to the second installation frame.

5. The method as claimed in claim 4, further comprising:
disconnecting the electrical components loaded on the first installation frame after the second body is seated on the second base; and
connecting the additional electrical components after disconnecting the electrical components loaded on the first installation frame.

6. The method as claimed in claim 3, wherein coupling the second installation frame to the first installation frame comprises coupling the second installation frame to the first installation frame before seating the second body on the second base.

7. The method as claimed in claim 3, further comprising fitting cladding to the second body, wherein coupling the second installation frame to the first installation frame comprises coupling the second installation frame to the first installation frame before fitting the cladding to the second body.

8. The method as claimed in claim 3, further comprising fitting cladding to the second body, wherein coupling the second installation frame to the first installation frame comprises coupling the second installation frame to the first installation frame after fitting the cladding to the second body.

9. The method as claimed in claim 1, further comprising fitting cladding to the second body.

10. The method as claimed in claim 9, wherein fitting cladding to the second body comprising fitting doors, side walls, and a rear wall to the second body.

11. The method as claimed in claim 9, wherein fitting the cladding to the second body comprises fitting the cladding to the second body after the second body is seated on the second base.

12. The method as claimed in claim 9, wherein fitting the cladding to the second body comprises fitting the cladding to the second body before the second body is seated on the second base.

13. The method as claimed in claim 9, wherein seating the roof module on the second body comprises seating the roof module over the cladding fitted to the second body.

14. The method as claimed in claim 1, further comprising assembling the second base from a base box and base feet before slipping the second base over the first installation frame and the first base, wherein the base feet are mounted under the base box and protrude laterally from sides of the base box.

15. The method as claimed in claim 1, further comprising:
removing the roof module from the second body before slipping the second body over the first installation frame and the first base; and
attaching lifting lugs to the second body before slipping the second body over the first installation frame and the first base.

16. A construction kit for a new distribution cabinet unit to enhance an old distribution cabinet unit, the old distribution cabinet unit including an old base, an old installation frame, and an old body, the construction kit comprising:
a new base defining a hollow interior that is at least as wide as the old base;
a new body configured to seat on the new base;
a new installation frame configured to attach to the old installation frame within the new body;
cladding configured to fit to the new body, the cladding including side walls, a rear wall, and at least one door;
at least one lifting lug removeably attached to the new body; and
at least one new roof module configured to seat on the new body over the cladding after the lifting lug is removed from the new body.

17. The construction kit as claimed in claim 16, further comprising perforated strips for fixing the old installation frame to the new body.

18. The construction kit as claimed in claim 16, further comprising adjusting screws for setting a distance between the new body and the old base or the old installation frame.

19. A distribution cabinet comprising:

a first base seated at a first ground level;

a first installation frame secured to the first base, the first installation frame being loaded with at least one electrical component;

a second base seated at a second ground level and surrounding the first base;

a body seated on the second base and enclosing the first installation frame; and a roof module seated on the body.

20. The distribution cabinet as claimed in claim 19, further comprising a second installation frame secured to the first installation frame within the body.

* * * * *